(12) United States Patent
Lee

(10) Patent No.: US 9,875,678 B2
(45) Date of Patent: Jan. 23, 2018

(54) IMAGE DISPLAY METHOD

(71) Applicant: Samsung Display Co., Ltd., Yongin, Gyeonggi-Do (KR)

(72) Inventor: Min-Tak Lee, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 336 days.

(21) Appl. No.: 14/559,765

(22) Filed: Dec. 3, 2014

(65) Prior Publication Data

US 2015/0356903 A1 Dec. 10, 2015

(30) Foreign Application Priority Data

Jun. 10, 2014 (KR) ........................ 10-2014-0070268

(51) Int. Cl.
*G09G 3/20* (2006.01)
*G09G 3/36* (2006.01)
*G06K 9/20* (2006.01)

(52) U.S. Cl.
CPC ......... *G09G 3/2003* (2013.01); *G06K 9/2063* (2013.01); *G09G 3/3648* (2013.01); *G06T 2207/20192* (2013.01); *G09G 2300/043* (2013.01); *G09G 2320/0242* (2013.01); *G09G 2320/0666* (2013.01)

(58) Field of Classification Search
CPC ... G09G 2310/0232; G09G 2320/0209; G09G 2310/061; G06T 2207/20192; G06K 9/2063; G06K 9/00449; G06K 2209/01; H04N 1/3878
See application file for complete search history.

(56) References Cited

U.S. PATENT DOCUMENTS

| | | | |
|---|---|---|---|
| 6,774,943 B1* | 8/2004 | Kao ........................ | H04N 5/208 348/252 |
| 2005/0129333 A1* | 6/2005 | Matsuyama ........... | G06K 9/228 382/295 |
| 2005/0201633 A1 | 9/2005 | Moon et al. | |
| 2006/0045379 A1* | 3/2006 | Heaney, Jr. ........ | G06K 9/00449 382/276 |
| 2007/0040778 A1* | 2/2007 | Karman ............. | G02B 27/2214 345/87 |

(Continued)

FOREIGN PATENT DOCUMENTS

KR 10-2010-0078623 A 7/2010
KR 10-2010-0084458 A 7/2010

(Continued)

*Primary Examiner* — Saptarshi Mazumder
(74) *Attorney, Agent, or Firm* — Knobbe Martens Olson & Bear LLP

(57) ABSTRACT

An image display method is disclosed. In one aspect, the image display method includes receiving image data including a black region and a white region, determining a boundary between the black and white regions, determining a pixel to be corrected which is adjacent to the boundary, and determining a direction of the boundary and an arrangement of the black and white regions with respect to the boundary. The method also includes converting pixel data corresponding to the pixel into corrected pixel data based at least in part on the boundary direction and the arrangement and displaying images on a display device based at least in part on corrected image data including the corrected pixel data.

20 Claims, 11 Drawing Sheets

(56) References Cited

U.S. PATENT DOCUMENTS

| | | | |
|---|---|---|---|
| 2007/0153106 A1 | 7/2007 | Subbotin | |
| 2008/0180455 A1* | 7/2008 | Ogino | G09G 3/2003 345/589 |
| 2010/0165157 A1 | 7/2010 | Hyun et al. | |
| 2010/0182466 A1 | 7/2010 | Chang et al. | |
| 2012/0162156 A1* | 6/2012 | Chen | G09G 3/3648 345/204 |
| 2013/0234917 A1 | 9/2013 | Lee | |
| 2013/0241946 A1 | 9/2013 | Jeong et al. | |
| 2014/0168525 A1* | 6/2014 | Hasegawa | H04N 9/317 348/745 |

FOREIGN PATENT DOCUMENTS

| | | |
|---|---|---|
| KR | 10-1000926 B1 | 12/2010 |
| KR | 10-1007754 B1 | 1/2011 |
| KR | 10-2013-0101874 A | 9/2013 |
| KR | 10-2013-0105145 A | 9/2013 |

* cited by examiner

FIG. 8A

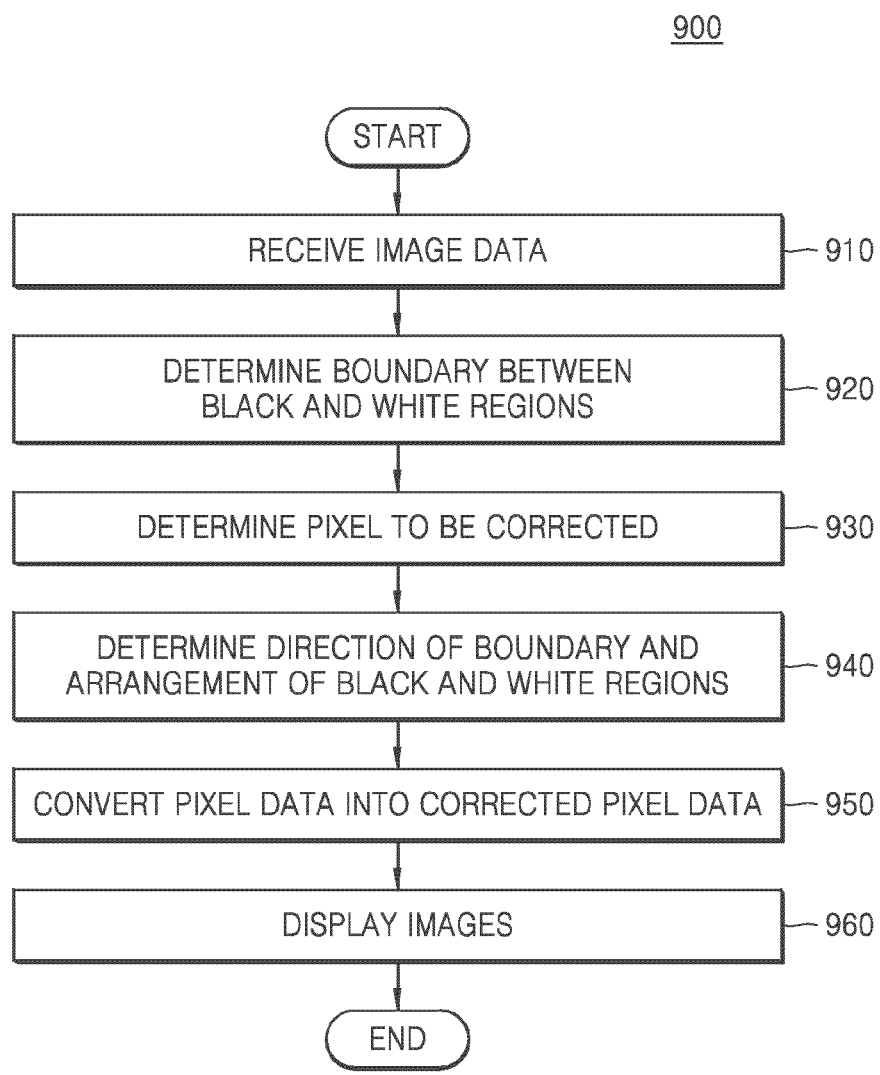

IMAGE DISPLAY METHOD

INCORPORATION BY REFERENCE TO ANY PRIORITY APPLICATIONS

This application claims the benefit of Korean Patent Application No. 10-2014-0070268, filed on Jun. 10, 2014, in the Korean Intellectual Property Office, the disclosure of which is incorporated herein in its entirety by reference.

BACKGROUND

Field

The described technology generally relates to an image display method.

Description of the Related Technology

Most flat panel displays generate images by using three sub-pixels that emit red, green, and blue light, respectively. If a black object is displayed on a white background or a white object is displayed on a black background, edge discoloration can occur. This phenomenon occurs when random colors (e.g., red, green, and blue) appear at a boundary between the white and black colors due to the layout of sub-pixels that form each pixel. Thus, a method of removing the edge discoloration is necessary.

SUMMARY OF CERTAIN INVENTIVE ASPECTS

One inventive aspect is an image display method for removing edge discoloration.

Another aspect is an image display method that includes: receiving image data; determining a boundary between a black region and a white region in the image data; determining a pixel to be corrected, which is adjacent to the boundary; determining a direction of the boundary adjacent to the pixel to be corrected and the arrangement of the black region and the white region with respect to the boundary; changing first pixel data corresponding to the pixel to be corrected into corrected pixel data based on the boundary direction and the arrangement of the black region and the white region; and displaying images on a display apparatus based on corrected image data including the corrected pixel data.

The determining of the boundary between the black region and the white region in the image data can include: determining a region, in which pixels corresponding to pixel data having a brightness value that is equal to or less than a first brightness value are grouped, as the black region; and determining a region, in which pixels corresponding to pixel data having a brightness value that is equal to or greater than a second brightness value are grouped, as the white region.

The determining of the boundary between the black region and the white region in the image data can include, if a difference between brightness values of pixel data respectively corresponding to two adjacent pixels is equal to or greater than a third brightness value, determining a space between the two adjacent pixels as the boundary, and wherein the determining a pixel to be corrected can include determining at least one of the two adjacent pixels as the pixel to be corrected.

The determining of the pixel to be corrected can include determining a pixel in the black region, which is adjacent to the boundary, as the pixel to be corrected, and the changing of the first pixel data to the corrected pixel data can include generating the corrected pixel data by increasing a value of at least one sub-pixel data included in the first pixel data by a value that is determined based on the boundary direction and the arrangement of the black region and the white region.

The determining of the pixel to be corrected can include determining a pixel in the white region, which is adjacent to the boundary, as the pixel to be corrected, and the changing of the first pixel data into the corrected pixel data can include generating the corrected pixel data by decreasing a value of at least one sub-pixel data included in the first pixel data by a value determined by the boundary direction and the arrangement of the black region and the white region.

The pixel to be corrected can include a first sub-pixel and a second sub-pixel, in which the first sub-pixel is closer to the boundary than the second sub-pixel, and in the changing of the first pixel data to the corrected pixel data, a variation amount of first sub-pixel data corresponding to the first sub-pixel can be determined to be greater than a variation amount of second sub-pixel data corresponding to the second sub-pixel.

The boundary direction can be determined as one selected from i) a horizontal direction, ii) a vertical direction, iii) a first diagonal direction passing through a first quadrant and a third quadrant, and iv) a second diagonal direction passing through a second quadrant and a fourth quadrant.

The display apparatus can include first pixels and second pixels that are alternately arranged along a horizontal direction and a vertical direction, first sub-pixels displaying a first color, second sub-pixels displaying a second color, and third sub-pixels displaying a third color, wherein each of the first pixels can include the first sub-pixel and the second sub-pixel and each of the second pixels can include the third sub-pixel and the second sub-pixel, and wherein the image data can include first sub-pixel data corresponding to the first sub-pixels, second sub-pixel data corresponding to the second sub-pixels, and third sub-pixel data corresponding to the third sub-pixels.

The first sub-pixel can be disposed at an upper left portion of the second sub-pixel in the first pixel, and the third sub-pixel can be disposed at an upper left portion of the second sub-pixel in the second pixel.

The determining of the pixel to be corrected can include determining a pixel in the black region, which is adjacent to the boundary, as the pixel to be corrected.

The changing of the first pixel data into the corrected pixel data can include, if the boundary direction is the horizontal direction and the black region is located above the boundary, generating the corrected pixel data by increasing a value of the second sub-pixel data in the first pixel data.

The changing of the first pixel data into the corrected pixel data can include, if the boundary direction is the horizontal direction and the black region is located under the boundary, generating the corrected pixel data by increasing a value of at least one of the first sub-pixel data and the third sub-pixel data in the first pixel data.

The changing of the first pixel data into the corrected pixel data can include, if the boundary direction is the vertical direction and the black region is located at a left portion of the boundary, generating the corrected pixel data by increasing a value of the second sub-pixel data in the first pixel data.

The changing of the first pixel data into the corrected pixel data can include, if the boundary direction is the vertical direction and the black region is located at a right portion of the boundary, generating the corrected pixel data by increasing a value of at least one of the first sub-pixel data and the third sub-pixel data in the first pixel data.

The image display method can further include performing a sub-pixel rendering operation on the first sub-pixel data and the third sub-pixel data of the image data, by displaying the third sub-pixel data in the pixel data corresponding to the first pixel by using the third sub-pixel in the second pixel that is adjacent to the first pixel and displaying the first sub-pixel data of the pixel data corresponding to the second pixel by using the first sub-pixel in the first pixel that is adjacent to the second pixel.

The changing of the first pixel data into the corrected pixel data can include, if the boundary direction is the vertical direction, generating the corrected pixel data by increasing a value of the second sub-pixel data in the first pixel data.

The changing of the first pixel data into the corrected pixel data can include, if the boundary direction is the first diagonal direction passing through the first quadrant and the third quadrant and the black region is located at an upper left portion of the boundary or if the boundary direction is the second diagonal direction passing through the second quadrant and the fourth quadrant and the black region is located at an upper right portion of the boundary, generating the corrected pixel data by increasing a value of the second sub-pixel data in the first pixel data.

The changing of the first pixel data into the corrected pixel data can include, if the boundary direction is the first diagonal direction passing through the first quadrant and the third quadrant and the black region is located at a lower right portion of the boundary or if the boundary direction is the second diagonal direction passing through the second quadrant and the fourth quadrant and the black region is located at a lower left portion of the boundary, generating the corrected pixel data by increasing a value of at least one of the first sub-pixel data and the third sub-pixel data in the first pixel data and a value of the second sub-pixel data in the first pixel data, wherein an increased amount of the value of the at least one of the first sub-pixel data and the third sub-pixel data in the first pixel data can be greater than an increased amount of the value of the second sub-pixel data in the first pixel data.

The determining of the pixel to be corrected can include determining a pixel in the white region, which is adjacent to the boundary, as the pixel to be corrected, and if the boundary direction is the horizontal direction and the white region is located above the boundary, generating the corrected pixel data by decreasing the value of the second sub-pixel data in the first pixel data.

The determining of the pixel to be corrected can include determining a pixel in the white region, which is adjacent to the boundary, as the pixel to be corrected, and if the boundary direction is the horizontal direction and the white region is located under the boundary, generating the corrected pixel data by decreasing the value of at least one of the first sub-pixel data and the third sub-pixel data in the first pixel data.

Another aspect is an image display method comprising receiving image data including a black region and a white region, determining a boundary between the black and white regions, determining a pixel to be corrected which is adjacent to the boundary, and determining a direction of the boundary and an arrangement of the black and white regions with respect to the boundary. The method also includes converting pixel data corresponding to the pixel into corrected pixel data based at least in part on the boundary direction and the arrangement and displaying images on a display device based at least in part on corrected image data including the corrected pixel data.

In the above method, the pixel determining comprises determining a region as the black region, in which there is a group of pixels corresponding to pixel data having a brightness value that is substantially equal to or less than a first brightness value, and determining a region as the white region, in which there is a group of pixels corresponding to pixel data having a brightness value that is substantially equal to or greater than a second brightness value.

In the above method, the pixel determining comprises, if the difference between first and second brightness values of the pixel data corresponding to two adjacent pixels is substantially equal to or greater than a third brightness value, determining a space between the two adjacent pixels as the boundary, wherein the boundary determining comprises determining at least one of the two adjacent pixels as the pixel to be corrected.

In the above method, the boundary determining comprises determining a pixel in the black region as the pixel to be corrected, wherein the converting comprises increasing a value of at least one sub-pixel data included in the pixel data by a value that is determined based at least in part on the boundary direction and the arrangement so as to generate the corrected pixel data.

In the above method, the boundary determining comprises determining a pixel in the white region as the pixel to be corrected, wherein the converting comprises decreasing a value of at least one sub-pixel data included in the pixel data by a value determined based at least in part on the boundary direction and the arrangement so as to generate the corrected pixel data.

In the above method, the pixel to be corrected comprises first and second sub-pixels, wherein the first sub-pixel is closer to the boundary than the second sub-pixel, and wherein the converting comprises determining whether a variation amount of first sub-pixel data corresponding to the first sub-pixel is greater than a variation amount of second sub-pixel data corresponding to the second sub-pixel.

In the above method, the boundary direction is one of i) a horizontal direction, ii) a vertical direction, iii) a first substantially diagonal direction extending from a first quadrant to a third quadrant, and iv) a second substantially diagonal direction extending from a second quadrant to a fourth quadrant, wherein the first to fourth quadrants are located with respect to the pixel to be corrected.

In the above method, the display device comprises first and second pixels that are alternately arranged along horizontal and vertical directions, wherein each of the first pixels comprises first and second sub-pixels respectively displaying first and second colors, wherein each of the second pixels comprises a third sub-pixel displaying a third color and the second sub-pixel, and wherein the image data comprises first to third sub-pixel data respectively corresponding to the first to third sub-pixels.

In the above method, the first and second sub-pixels are respectively located at an upper left portion of the second sub-pixel in the first and second pixels.

In the above method, the boundary determining comprises determining a pixel in the black region as the pixel to be corrected.

In the above method, the converting comprises, if the boundary direction is the horizontal direction and the black region is located above the boundary, increasing a value of the second sub-pixel data in the pixel data so as to generate the corrected pixel data.

In the above method, the converting comprises, if the boundary direction is the horizontal direction and the black region is located below the boundary, increasing a value of at least one of the first and third sub-pixel data in the pixel data so as to generate the corrected pixel data.

In the above method, the converting comprises, if the boundary direction is the vertical direction and the black region is located at a left portion of the boundary, increasing a value of the second sub-pixel data in the pixel data so as to generate the corrected pixel data.

In the above method, the converting comprises, if the boundary direction is the vertical direction and the black region is located at a right portion of the boundary, increasing a value of at least one of the first and third sub-pixel data in the pixel data so as to generate the corrected pixel data.

The above method further comprises performing a sub-pixel rendering operation on the first and third sub-pixel data of the image data, wherein the performing comprises i) displaying the third sub-pixel data of the first pixel by using the third sub-pixel in one of the adjacent second pixels and ii) displaying the first sub-pixel data of the second pixel by using the first sub-pixel in one of the adjacent first pixels.

In the above method, the converting comprises, if the boundary direction is the vertical direction, increasing a value of the second sub-pixel data in the pixel data so as to generate the corrected pixel data.

In the above method, the converting comprises, if i) the boundary direction is a first substantially diagonal direction extending from a first quadrant to a third quadrant and the black region is located at an upper left portion of the boundary or ii) the boundary direction is a second substantially diagonal direction extending from a second quadrant to a fourth quadrant and the black region is located at an upper right portion of the boundary, increasing a value of the second sub-pixel data in the pixel data so as to generate the corrected pixel data, wherein the first to fourth quadrants are located with respect to the pixel to be corrected.

In the above method, the converting comprises, if i) the boundary direction is a first substantially diagonal direction extending from a first quadrant to a third quadrant and the black region is located at a lower right portion of the boundary or ii) the boundary direction is a second substantially diagonal direction extending from a second quadrant to a fourth quadrant and the black region is located at a lower left portion of the boundary, increasing a first value of at least one of the first and third sub-pixel data in the pixel data and a second value of the second sub-pixel data in the pixel data so as to generate the corrected pixel data, wherein the first to fourth quadrants are located with respect to the pixel to be corrected, and wherein the increased amount of the first value is greater than the increased amount of the second value.

In the above method, the boundary determining comprises determining a pixel in the white region as the pixel to be corrected, wherein, if the boundary direction is the horizontal direction and the white region is located above the boundary, decreasing the value of the second sub-pixel data in the pixel data so as to generate the corrected pixel data.

In the above method, the boundary determining comprises determining a pixel in the white region as the pixel to be corrected, wherein, if the boundary direction is the horizontal direction and the white region is located below the boundary, decreasing the value of at least one of the first sub-pixel data and the third sub-pixel data in the pixel data so as to generate the corrected pixel data.

BRIEF DESCRIPTION OF THE DRAWINGS

FIG. 8A is a diagram exemplarily showing image data of a white square in a black background and corrected image data of the image data according to an embodiment.

[FIG. 9 is a flowchart showing an exemplary operation for displaying an image according to one embodiment.]

DETAILED DESCRIPTION OF CERTAIN INVENTIVE EMBODIMENTS

Figure 1:
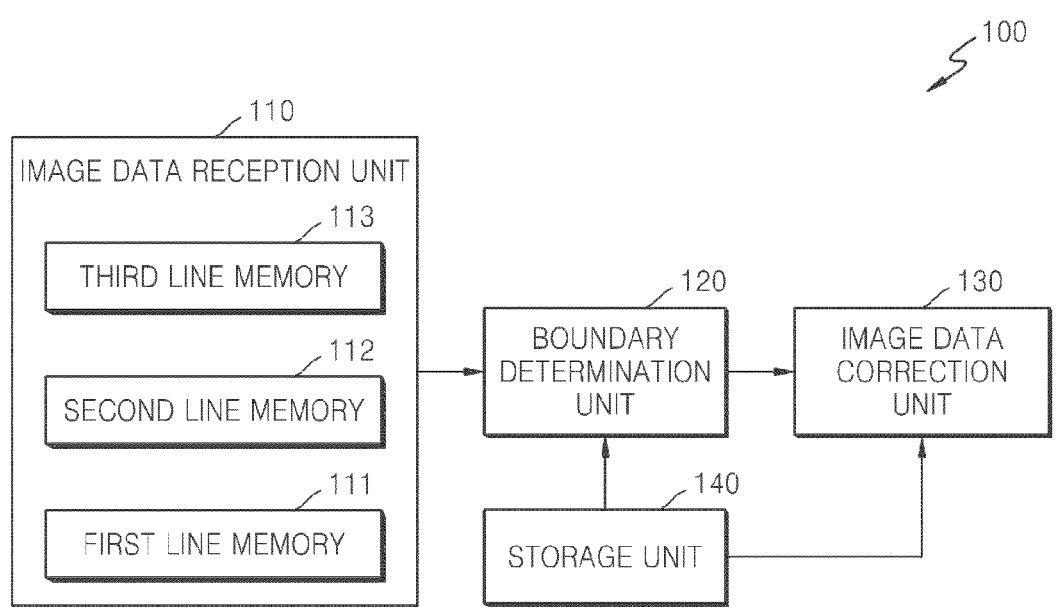
FIG. 1 is a block diagram of a data correction apparatus according to an embodiment.

As the described technology allows for various changes and numerous embodiments, particular embodiments will be illustrated in the drawings and described in detail in the written description. However, this is not intended to limit the described technology to particular modes of practice, and it is to be appreciated that all changes, equivalents, and substitutes that do not depart from the spirit and technical scope of the inventive technology are encompassed in the described technology.

Hereinafter, the described technology will be described in detail by explaining exemplary embodiments with reference to the attached drawings. Like reference numerals in the drawings denote like elements.

It will be understood that although the terms "first", "second", etc. can be used herein to describe various components, these components should not be limited by these terms. These components are only used to distinguish one component from another. As used herein, the singular forms "a", "an", and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. Expressions such as "at least one of," when preceding a list of elements, modify the entire list of elements and do not modify the individual elements of the list. In this disclosure, the term "substantially" includes the meanings of completely, almost completely or to any significant degree under some applications and in accordance with those skilled in the art. Moreover, "formed on" can also mean "formed over." The term "connected" can include an electrical connection.

FIG. 1 is a block diagram of a data correction apparatus 100 according to an embodiment.

Referring to FIG. 1, the data correction apparatus 100 includes an image data reception unit 110, a boundary determination unit 120, and an image data correction unit 130. The data correction apparatus 100 further includes a storage unit 140.

The image data reception unit 110 can externally receive image data to be displayed on a display apparatus, or can read image data stored in the storage unit 140. The image data can be RGB color image data. However, embodiments are not limited thereto, and the color image data can be data of various color model types, for example, CMY data, YIQ data, HIS data, and HSV data.

The image data reception unit 110 includes first through third line memories 111-113. The image data reception unit 110 can store line data that is displayed on one line of the display apparatus from the image data in the first line memory 111. The image data reception unit 110 transfers the line data that is stored in the first line memory 111 to the second line memory 112. Then, the image data reception unit 110 stores line data that will be displayed on a next line of the display apparatus in the first line memory 111. The image data reception unit 110 can store the line data stored in the second line memory 112 in the third line memory 113, transfer the line data stored in the first line memory 111 to the second line memory 112, and then store line data that will be displayed on a next line of the display apparatus in the first line memory 111. Accordingly, the image data reception unit 110 can sequentially store the image data in the first through third line memories 111-113.

The boundary determination unit 120 determines a boundary between a black region and a white region based on the line data stored in the first through third line memories 111-113. The black region is defined as a region of a group of pixels corresponding to pixel data having a brightness value that is substantially equal to or less than a first brightness value. The white region is defined as a region of a group of pixels corresponding to pixel data having a brightness value that is equal to or greater than a second brightness value. Here, the first brightness value is, for example, about 10% of a brightness value of full white, and the second brightness value is, for example, about 90% of the brightness value of full white. The embodiments are not limited to the values above. For example, the black region can be defined as a region displaying pixel data corresponding to full black (for example, 0, 0, 0), and the white region can be defined as a region displaying pixel data corresponding to full white (for example, 255, 255, 255). The calculation of the brightness value from the image data, for example, the RGB image data, can be performed by using a well-known conversion method.

The boundary determination unit 120 can extract 3×3 pixel data from the line data stored in the first through third line memories 111-113. The boundary determination unit 120 can determine a boundary between the black region and the white region based on a difference between center pixel data that is located at a center among the 3×3 pixel data and the other pixel data adjacent to the center pixel data. For example, if the difference between the brightness values of the center pixel data and the adjacent pixel data is substantially equal to or greater than a third brightness value, it is determined that the boundary between the black region and the white region exists between the pixel area corresponding to the center pixel data and the pixel area corresponding to the adjacent pixel data. Here, the third brightness value corresponds to, for example, 90% of the brightness value of full white.

The boundary determination unit 120 can determine a direction of the boundary and the arrangement of the black and white regions with respect to the boundary, based at least in part on the 3×3 pixel data. The boundary determination unit 120 can determine whether the 3×3 pixel data corresponds to the black region or the white region. In following description, if one pixel data among the 3×3 pixel data corresponds to the black region, this pixel data is expressed by 0. If one pixel data among the 3×3 pixel data corresponds to the white region, this pixel data is expressed by 1. If the pixel data corresponds to neither the black region nor the white region, the corresponding pixel data is expressed by x. Also, in the following description, the 3×3 pixel data is expressed in a format such as (abc, def, ghi). Here, a-i each denote 0, 1, or x (for example, a can be 0, 1, or x; b can be 0, 1, or x; d can be 0, 1, or x; etc.). That is, a corresponds to the pixel data in an upper row (that is, first row) and a left side (that is, first column) from among the 3×3 pixel data. Likewise, e corresponds to the pixel data located in an intermediate row (that is, second row) at an intermediate portion (that is, second column) from among the 3×3 pixel data. And i corresponds to the pixel data located in a lower row (that is, third row) at a right side (that is, third column) from among the 3×3 pixel data. For example, if 3×3 pixel data includes 111, 111, 000, the pixel data in the first and second rows correspond to the white region and the pixel data in the third row correspond to the black region. The boundary determination unit 120 extracts the 3×3 pixel data from the line data stored in the first through third line memories 111-113 and determines whether the extracted 3×3 pixel data corresponds to the black region or the white region to generate the 3×3 pixel data pattern such as (abc, def, ghi).

The boundary determination unit 120 can determine whether there is a boundary that is adjacent to the center pixel data among the 3×3 pixel data, determine the direction of the boundary, and determine the arrangement of the black region and the white region based on the boundary, with reference to the 3×3 pattern stored in the storage unit 140. Examples of the 3×3 pattern stored in the storage unit 140 are shown in FIGS. 2A through 2P. FIGS. 2A through 2H show 3×3 patterns when center pixel data corresponds to the black region. FIGS. 2I through 2P show 3×3 patterns when center pixel data corresponds to the white region.

Figure 2:
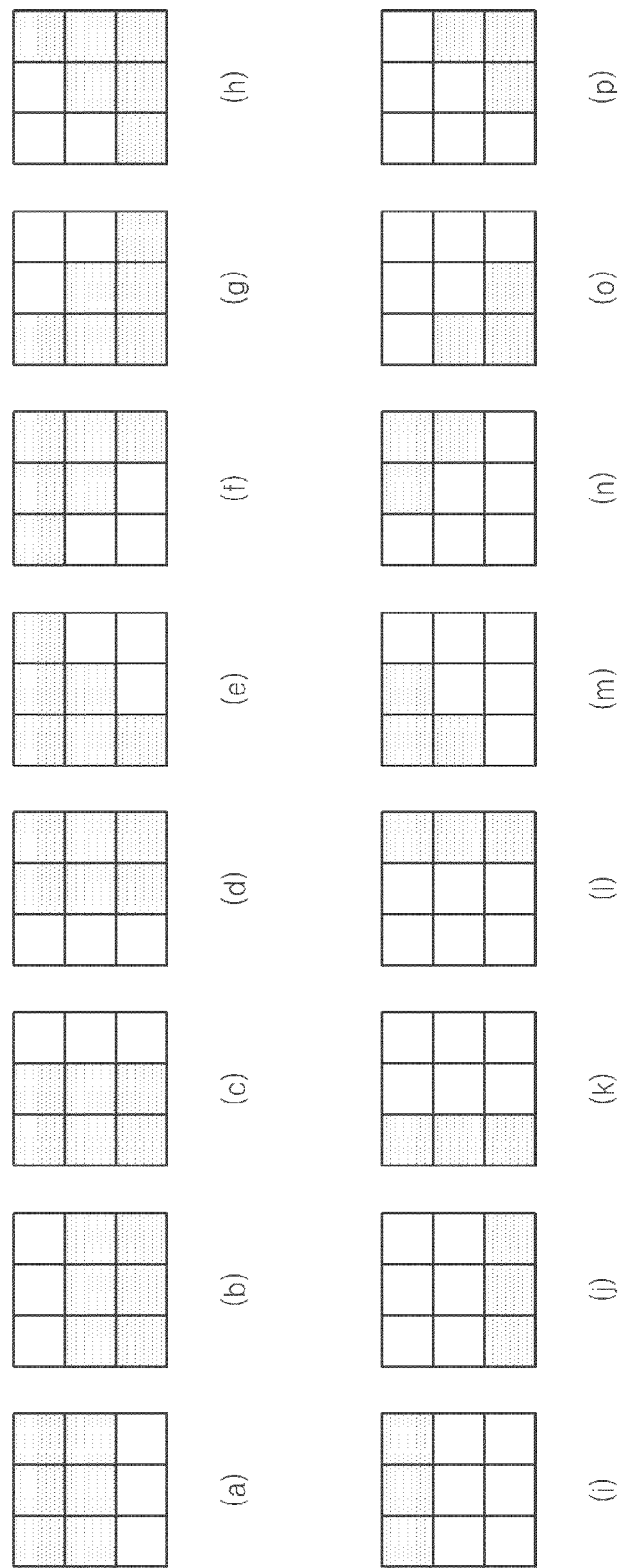
FIG. 2 is a diagram showing examples of 3×3 patterns stored in a storage unit, according to an embodiment.

For example, when a pattern of the 3×3 pixel data is (111, 111, 000), this pattern is equal to a (j) pattern in FIG. 2. The boundary determination unit 120 can determine that the center pixel data corresponds to the white region, a boundary adjacent to the center pixel data exists between a second row and a third row along the column direction, and the white region is located above the boundary and the black region is located below the boundary. As another example, if a pattern of the 3×3 pixel data is (000, 001, 011), this pattern is equal to an (e) pattern of FIG. 2. The boundary determination unit 120 determines that the center pixel data corresponds to the black region, a boundary adjacent to the center pixel data exists along a diagonal direction passing through a first quadrant and a third quadrant (for example, a first diagonal direction), and the black region is located on a left upper portion of the boundary and the white region is located on a right lower portion of the boundary. The diagonal direction passing through the first quadrant and the third quadrant is referred to as the first diagonal direction, and a diagonal direction passing through a second quadrant and a fourth quadrant is referred to as a second diagonal direction. The top right portion is the first quadrant, the bottom right is the second quadrant, the bottom left portion is the third quadrant, and the top left portion is the fourth quadrant.

The boundary determination unit 120 determines the center pixel data, the boundary direction, and the arrangement of the black and white regions with respect to the boundary based at least in part on whether the pattern of the 3×3 pixel data is equal to the 3×3 pattern stored in the storage unit 140, as shown in table below. The table represents the pixel data, the boundary directions, and the arrangements of the black and white regions with respect to the boundary, of the 3×3 patterns of FIG. 2. As shown in the table, the boundary direction is determined as one selected from a row direction (for example, a horizontal direction), a column direction (for example, a vertical direction), the first diagonal direction, and the second diagonal direction. However, the embodiments are not limited thereto, and if the pixel region corresponding to the center pixel data is located at a corner of the black region or the white region, the boundary direction can be determined by a plurality of directions representing the corner (for example, right row direction and upper column direction).

TABLE 1

| pattern | Center pixel data | Boundary direction | Arrangement of black region | Arrangement of white region |
|---|---|---|---|---|
| (a) | Black region | Row direction | Upper | Lower |
| (b) | Black region | Row direction | Lower | Upper |
| (c) | Black region | Column direction | Left | Right |
| (d) | Black region | Column direction | Right | Left |
| (e) | Black region | First diagonal direction | Upper left | Lower right |
| (f) | Black region | Second diagonal direction | Upper right | Lower left |
| (g) | Black region | Second diagonal direction | Lower left | Upper right |
| (h) | Black region | First diagonal direction | Lower right | Upper left |
| (i) | White region | Row direction | Upper | Lower |
| (j) | White region | Row direction | Lower | Upper |
| (k) | White region | Column direction | Left | Right |
| (l) | White region | Column direction | Right | Left |
| (m) | White region | First diagonal direction | Upper left | Lower right |
| (n) | White region | Second diagonal direction | Upper right | Lower left |
| (o) | White region | Second diagonal direction | Lower left | Upper right |
| (p) | White region | First diagonal direction | Lower right | Upper left |

In addition to the 3×3 patterns shown in FIG. 2, other patterns can be further provided. For example, there is a 3×3 pattern representing the center pixel data located at a corner. For example, in the case of a pattern (001, 001, 111), the pattern denotes a lower right corner of a black square. In this case, the boundary direction is the left row direction and upper column direction, the black region is located on an upper left portion, and the white regions are located at the upper right portion, the lower right portion, and the lower left portion. As another example, a pattern (111, 010, 000) denotes a lower corner of a white rhombus, and the boundary direction is an upper right first diagonal direction and an upper left second diagonal direction, the white region is disposed on an upper portion, and the black regions are disposed at left, right, and lower portions.

The boundary determination unit 120 determines that the pixel region corresponding to the center pixel data is not adjacent to the boundary if any one of the 3×3 pixel data does not correspond to the black region or the white region. Also, the boundary determination unit 120 determines that the pixel region corresponding to the center pixel data is not adjacent to the boundary if the pattern of the 3×3 pixel data does not coincide with the 3×3 patterns stored in the storage unit 140.

In the above manner, the boundary determination unit 120 determines whether a region corresponding to the pixel data is the black region or the white region, whether there is a boundary adjacent to the region, the boundary direction, and how the black and white regions are arranged with respect to the boundary.

The image data correction unit 130 corrects or adjusts line data stored in the second line memory 112 based at least in part on results from the boundary determination unit 120. The image data correction unit 130 can determine pixels to be corrected. The boundary between the black region and the white region is defined between two pixels, and one of the two pixels is included in the black region and the other is included in the white region. The image data correction unit 130 can determine the pixel included in the black region adjacent to the boundary as the pixel to be corrected, the pixel included in the white region adjacent to the boundary as the pixel to be corrected, or both the two pixels adjacent to the boundary as the pixels to be corrected.

When the image data correction unit 130 determines the pixel to be corrected, the image data correction unit 130 receives the boundary direction to be corrected and the arrangements of the black and white regions from the boundary determination unit 120 and can correct pixel data corresponding to the pixel to be corrected based on the boundary direction and the arrangements of the black and white regions so as to generate correction pixel data corresponding to the pixel to be corrected. A value of the correction pixel data can be determined based at least in part on a value of the pixel data corresponding to the pixel to be corrected, the direction of the boundary adjacent to the pixel to be corrected, and the arrangements of the black and white regions with respect to the boundary.

In this embodiment, the storage unit 140 stores the value of the pixel data corresponding to the pixel to be corrected, the direction of the boundary adjacent to the pixel to be corrected, and the value of the correction pixel data according to the arrangements of the black and white regions with respect to the boundary. For example, if the pixel data is (0, 0, 0), the boundary direction is the row direction, and the black region is above the boundary and the white region is below the boundary, the correction pixel data can be, for example, (0, 170, 0).

In another embodiment, the storage unit 140 stores a direction of the boundary adjacent to the pixel to be corrected and a difference between the pixel data corresponding to the pixel to be corrected and the correction pixel data according to the arrangement of the black and white regions with respect to the boundary. For example, if the boundary direction is the row direction and the black region is above the boundary and the white region is below the boundary, the difference between the values of the pixel data and the correction pixel data can be (0, 170, 0). If the pixel data has a value of (10, 20, 10), the correction pixel data can have a value, for example, of (10, 190, 10).

Information about the correction pixel data stored in the storage unit 140 is related to an arrangement of sub-pixels. For example, in a display device in which pixels are arranged as stripe type, that is, three sub-pixels (that is, a red sub-pixel, a green sub-pixel, and a blue sub-pixel) in the pixel are arranged in the row direction, if a white rectangle is displayed on a black background, an upper edge and a lower edge of the rectangle is represented as white. However, since the red sub-pixel is adjacent to a left edge of the rectangle, the left edge of the rectangle is represented as red, not white, and since the blue sub-pixel is adjacent to a right edge of the rectangle, the right edge of the rectangle is represented as blue, not white.

In the present embodiment, the image data is corrected so that a black pixel adjacent to the left edge of the rectangle can display green and blue slightly, and thus, red discoloration at the left edge of the rectangle can be removed. Here, a brightness of the green light displayed by the black pixel is reduced so as to be less than that of blue light. In this embodiment, the left edge of the rectangle is represented as complete white, because the blue sub-pixel is closer to the left edge of the rectangle than the green sub-pixel in the black pixel. To do this, an increased amount of sub-pixel data corresponding to the blue sub-pixel can be greater than that of sub-pixel data corresponding to the green sub-pixel.

Also, in the above example, the image data is corrected so that the black pixel adjacent to the right edge of the rectangle displays red and green colors slightly, so that blue discoloration at the right edge of the rectangle is removed. Here, a brightness of the green color displayed by the black pixel is reduced so as to be less than that of the red color. Then, the right edge of the rectangle can be completely displayed white because the red sub-pixel is closer to the right edge of the rectangle than the green sub-pixel. To do this, an increased amount of sub-pixel data corresponding to the red sub-pixel is greater than that of sub-pixel data corresponding to the green sub-pixel.

Moreover, in the above example, the image data is corrected so that a white pixel adjacent to the left edge of the rectangle displays red and green colors with low brightness and a white pixel adjacent to the right edge of the rectangle displays blue and green colors with low brightness. Thus, discolorations at the left and right edges of the rectangle are removed. In this case, a reduced amount of sub-pixel data corresponding to the red sub-pixel that is closer to the left edge of the white pixel is greater than that of sub-pixel data corresponding to the green sub-pixel. And a reduced amount of sub-pixel data corresponding to the blue sub-pixel that is closer to the right edge is greater than that of the sub-pixel data corresponding to the green sub-pixel.

The above edge discoloration can become worse in a PenTile display apparatus. A PenTile display apparatus includes first pixels, each including a first sub-pixel emitting red light and a second sub-pixel emitting green light, and second pixels, each including a third sub-pixel emitting blue light and the second sub-pixel. The first and second pixels are alternately located along a row direction and a column direction. In order to emit white light, one first sub-pixel, one third sub-pixel, and two second sub-pixels have to emit red, blue, and green light at a maximum brightness, and thus, an area occupied by the first sub-pixel and the third sub-pixel is two times greater than that occupied by one second sub-pixel. Accordingly, the edge discoloration at the boundary between a black region and a white region can become severe.

In particular, in a diamond PenTile display apparatus in which sub-pixels are arranged in a rhombus shape, edge discoloration can occur at upper and lower boundaries, as well as left and right boundaries. In the diamond PenTile display apparatus, first pixels and second pixels are alternately arranged along the row direction and the column direction. However, the first sub-pixel and the second sub-pixel in each of the first pixels are arranged in a diagonal direction and the third sub-pixel and the second sub-pixel in each of the second pixels are arranged in another diagonal direction. Accordingly, the second sub-pixels are arranged along the first diagonal direction and the second diagonal direction, and the first sub-pixels and the third sub-pixels are alternately arranged along the first diagonal direction and the second diagonal direction.

Hereinafter, an image display method capable of removing edge discoloration in a diamond PenTile display apparatus will be described according to an embodiment. The PenTile includes the first sub-pixel located on an upper left portion of the second sub-pixel in each first pixel and the third sub-pixel located on an upper left portion of the second sub-pixel in each second pixel.

Figure 3:
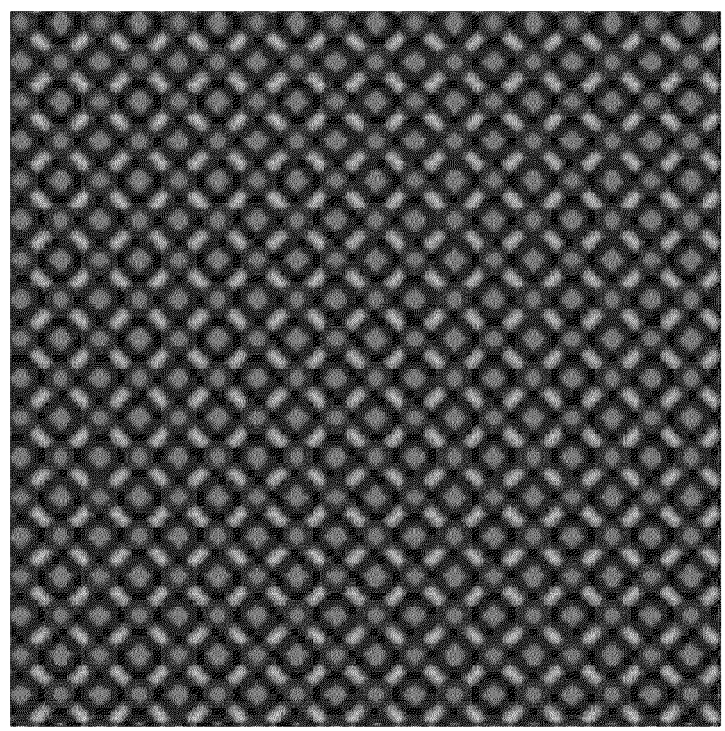
FIG. 3 is a diagram of an arrangement of sub-pixels in a diamond PenTile display apparatus.

FIG. 3 is a diagram showing arrangements of sub-pixels in a diamond PenTile display apparatus.

As shown in FIG. 3, the diamond PenTile display apparatus includes red sub-pixels, green sub-pixels, and blue sub-pixels. One red sub-pixel and one green sub-pixel located at a lower right portion of the red sub-pixel form the first pixel. One blue sub-pixel and one green sub-pixel located at a lower right portion of the blue sub-pixel form the second pixel.

Figure 4A:
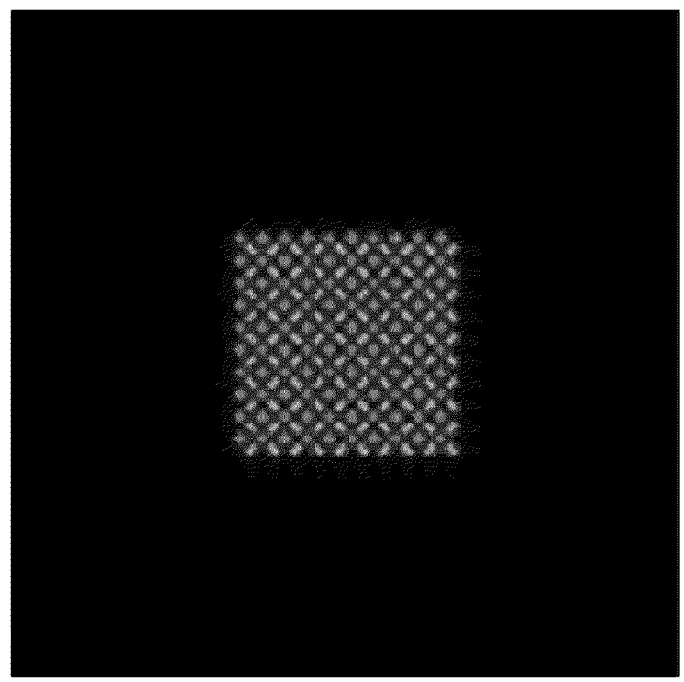
FIG. 4A is a diagram of a screen, in which a white square is displayed in a black background by using a diamond PenTile display apparatus.
Figure 4B:
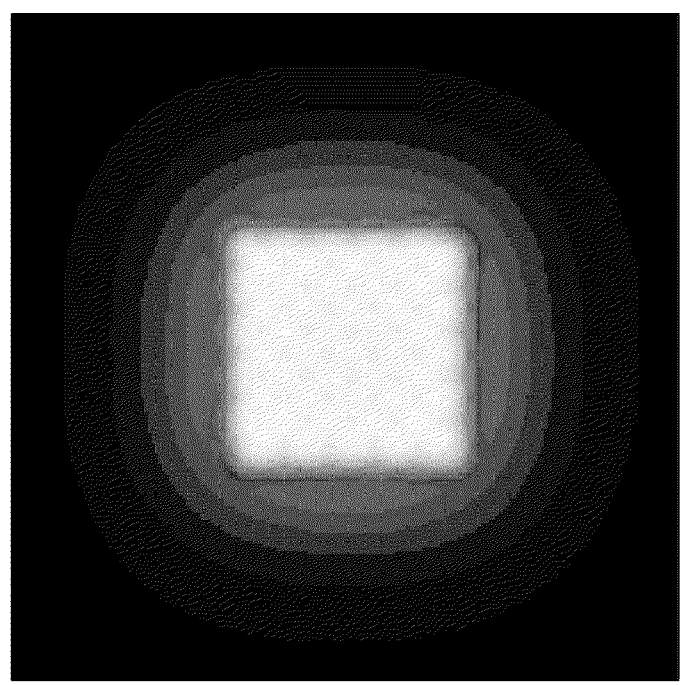
FIG. 4B is a view of an image of the screen of FIG. 4A, seen from a viewer's point.

FIG. 4A is a diagram of a screen displaying a white square in a black background by using a diamond PenTile display apparatus. FIG. 4B is a view of the screen shown in FIG. 4A, seen from a viewer's point.

Figure 5A:
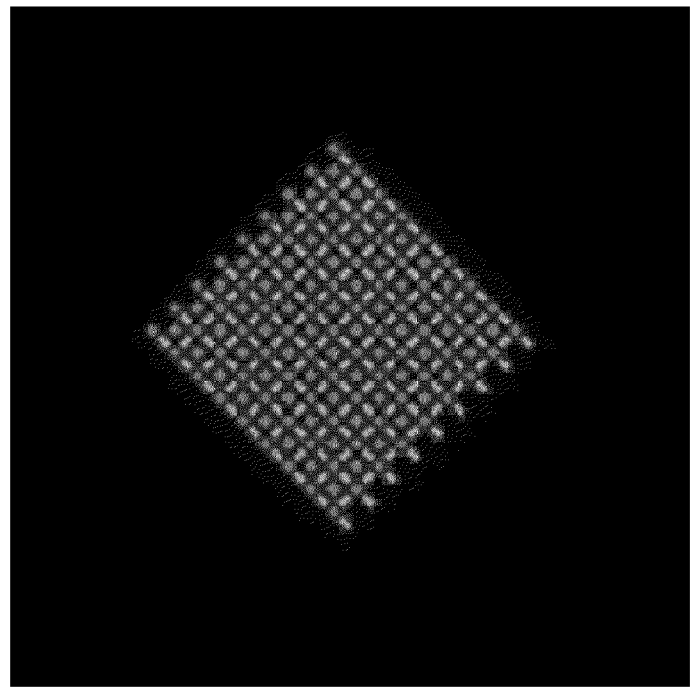
FIG. 5A is a diagram of a screen, in which a white rhombus is displayed in a black background by using a diamond PenTile display apparatus.
Figure 5B:
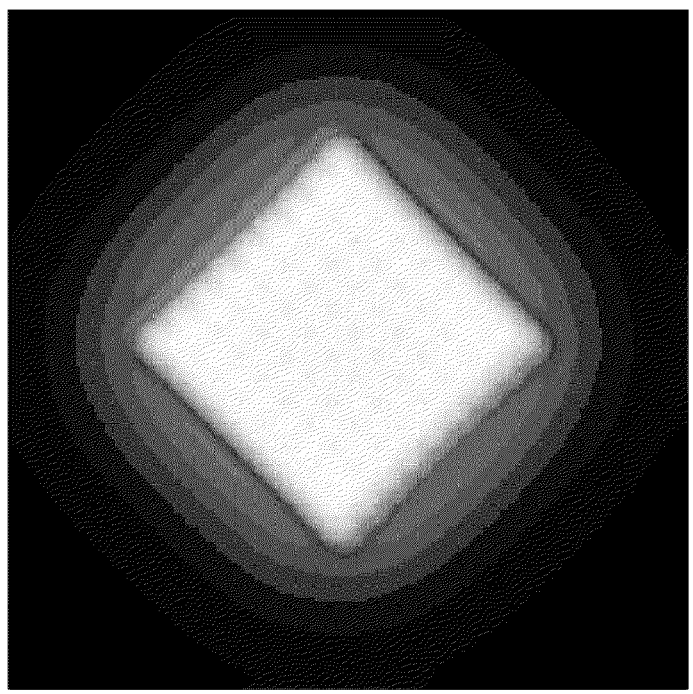
FIG. 5B is a view of an image of the screen of FIG. 5A, seen from a viewer's point.

FIG. 5A is a diagram of a screen displaying a white rhombus in a black background by using the diamond PenTile display apparatus, and FIG. 5B is a view of the screen shown in FIG. 5A, seen from a viewer's point.

Referring to FIGS. 4B and 5B, a boundary between the black background and the white square and a boundary between the black background and the white rhombus are not represented as white, but another color. This is referred to as edge discoloration. The edge discoloration often occurs in the diamond PenTile display apparatus.

As shown in FIG. 4B, an upper edge and a left edge of the square are represented as red and blue, and a lower edge and a right edge of the square are represented as green. Referring to FIG. 4A, this is because the red sub-pixel and the blue sub-pixel located on an upper end and a left end of the square display red and blue, and the green sub-pixel located at a lower end and a right end of the square only displays green.

As shown in FIG. 5B, an upper left edge of the rhombus is represented as red, an upper right edge and a lower left edge of the rhombus are represented as yellow, and a lower right edge of the rhombus is represented as green. Referring to FIG. 5A, it is shown that the red sub-pixels arranged on the upper left edge of the rhombus only display red. The upper right and lower left edges are represented by the red sub-pixels and the green sub-pixels mixed to represent yellow (in FIG. 5B). The green sub-pixels located at the lower right edge of the rhombus display green.

Since two sub-pixels are included in one pixel in the PenTile display apparatus, each pixel can display red, green, and blue by using a sub-pixel emitting another color in an adjacent pixel. A first pixel can display blue by using a third sub-pixel in a second pixel adjacent thereto. The second pixel can display red by using a first sub-pixel of the first pixel adjacent thereto. To do this, a sub-pixel rendering operation can be performed on red data and blue data in the image data. The sub-pixel rendering can be performed by filtering the red data and the blue data of the image data by using a horizontal diffusion filter. When the horizontal diffusion filter is expressed as a 3×3 matrix, a center coefficient and a left coefficient are both about 0.5. Through the horizontal diffusion filtering, the red data of the first pixel has a value that is an average between a value of the red data of the first pixel and a value of the red data of the second pixel that is on the left side of the first pixel. Also, the blue data of the second pixel has an average value between a value of the blue data of the second pixel and a value of the blue data of the first pixel that is located at a left side of the second pixel.

Figure 6A:
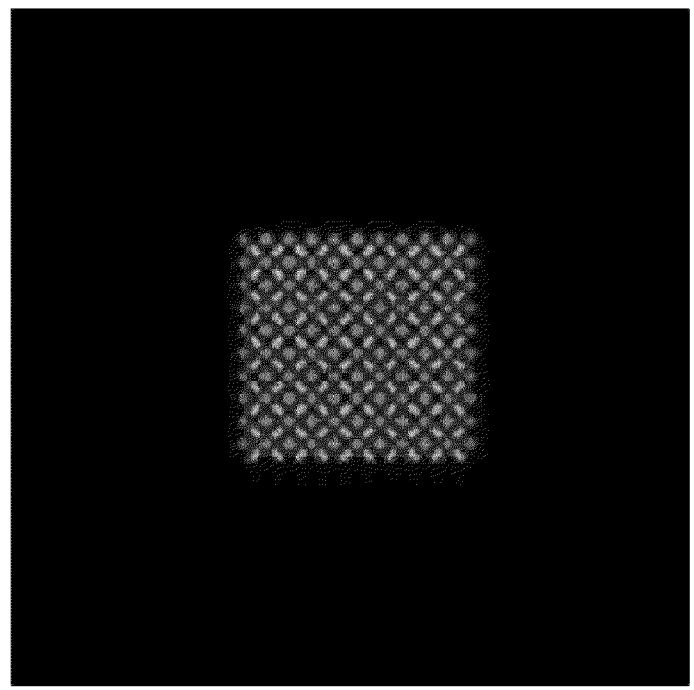
FIG. 6A is a diagram of a screen showing data obtained by performing a sub-pixel rendering on image data corresponding to a white square in a black background by using a diamond PenTile display apparatus.
Figure 6B:
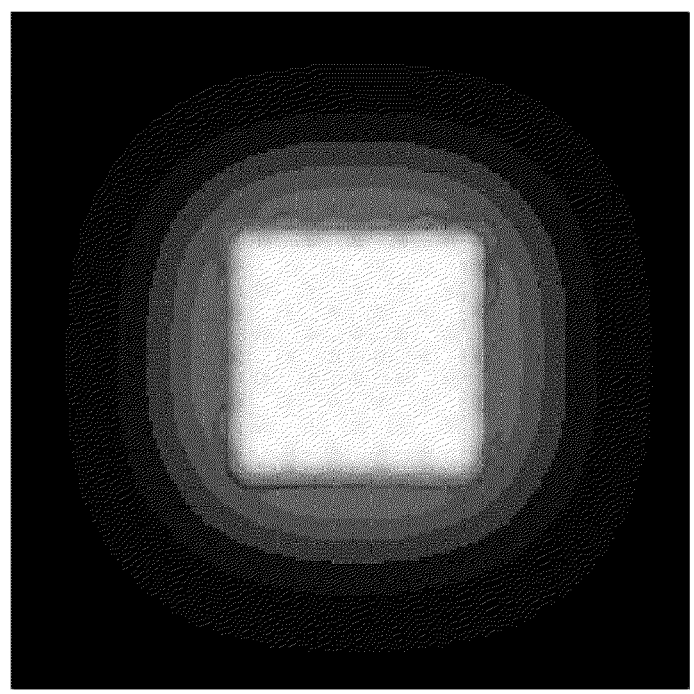
FIG. 6B is a view of an image of the screen shown in FIG. 6A, seen from a viewer's point.

FIG. 6A shows a screen displaying data obtained by performing a sub-pixel rendering on image data corresponding to a white square in a black background in a diamond PenTile display apparatus. FIG. 6B is a view of the screen shown in FIG. 6A, seen from a viewer's point.

Figure 7A:
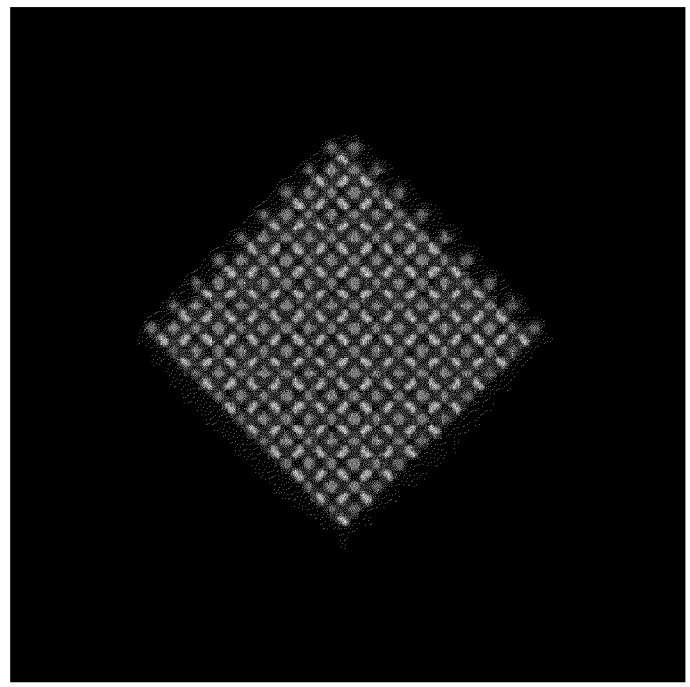
FIG. 7A is a diagram of a screen showing data obtained by performing a sub-pixel rendering on image data corresponding to a white rhombus in a black background by using a diamond PenTile display apparatus.
Figure 7B:
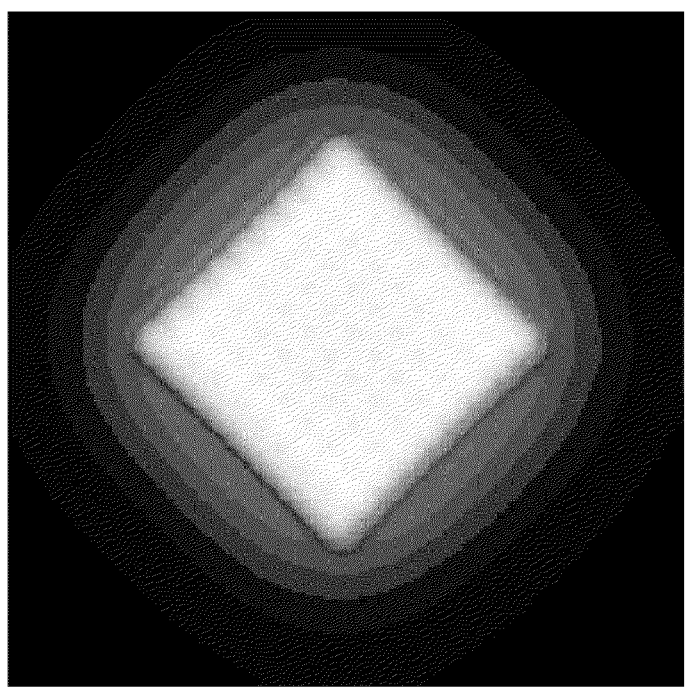
FIG. 7B is a view of an image of the screen shown in FIG. 7A, seen from a viewer's point.

FIG. 7A shows a screen displaying data obtained by performing a sub-pixel rendering on image data corresponding to a white rhombus in a black background in a diamond PenTile display apparatus. FIG. 7B is a view of the screen shown in FIG. 7A, seen from a viewer's point.

Referring to FIG. 6A, due to the sub-pixel rendering operation, the red sub-pixel and the blue sub-pixel at a right edge of the square represent red and blue. However, the red and blue sub-pixels located at the right edge and a left edge of the square can emit red and blue light with less brightness than those of the red and blue sub-pixels located at substantially the center. As shown in FIG. 6B, the upper edge, the left edge, and the right edge of the square represent red and blue colors, and a lower edge of the square represents green color. The red light and the blue light emitted from the left and right edges of the square have lower brightness level than that of the upper edge.

Referring to FIG. 7A, due to the sub-pixel rendering operation, the blue sub-pixels display blue color at an upper right edge and a lower right edge of the rhombus. Also, the red sub-pixels located at an upper left edge and a lower left edge of the rhombus emit red light at a lower brightness level than that of the red sub-pixels located at substantially the center. As shown in FIG. 7B, the upper left edge of the rhombus represents red color, the lower left edge represents yellow color, and the lower right edge represents blue-green color.

Figure 8A:
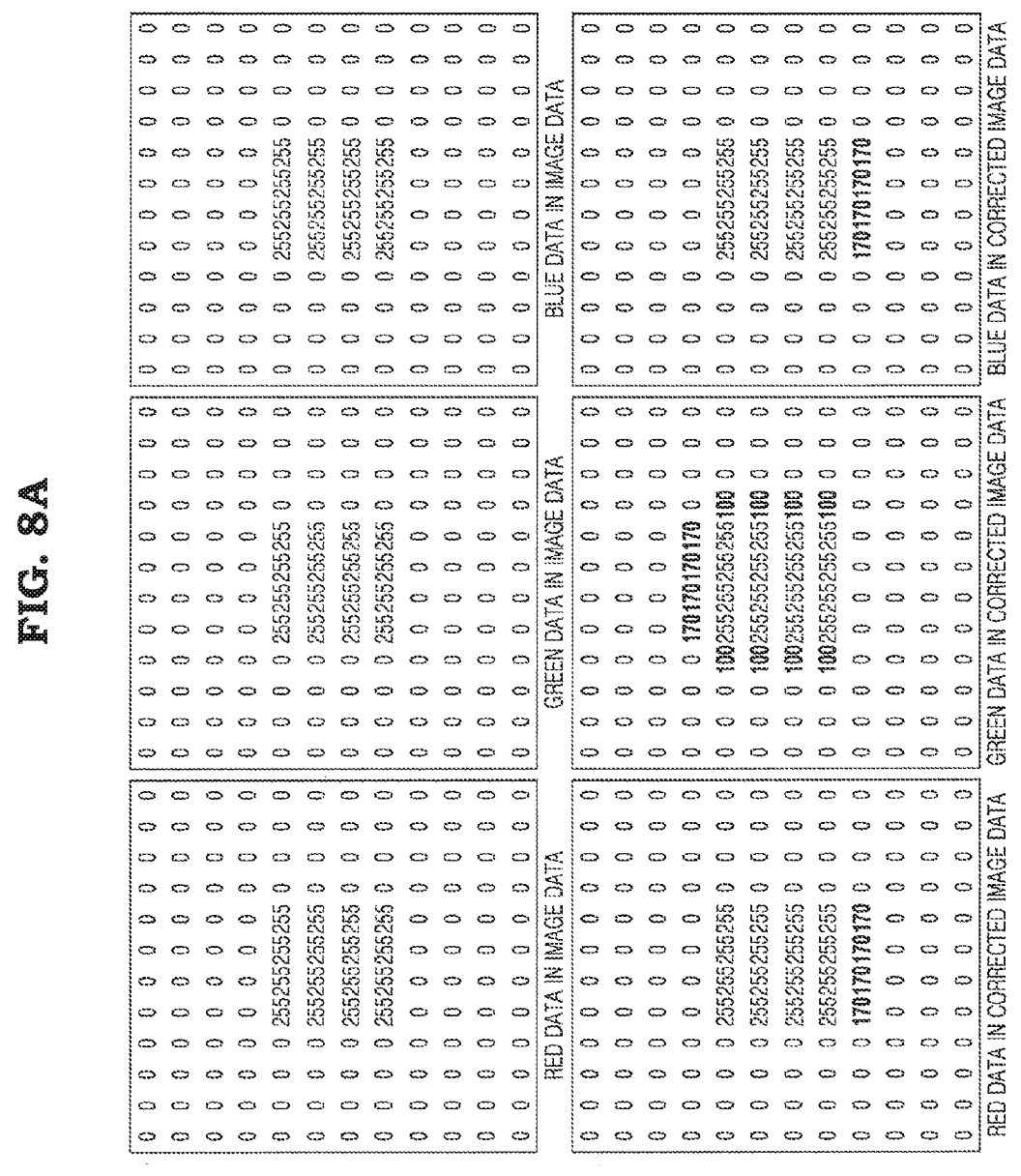
Figure 8B:
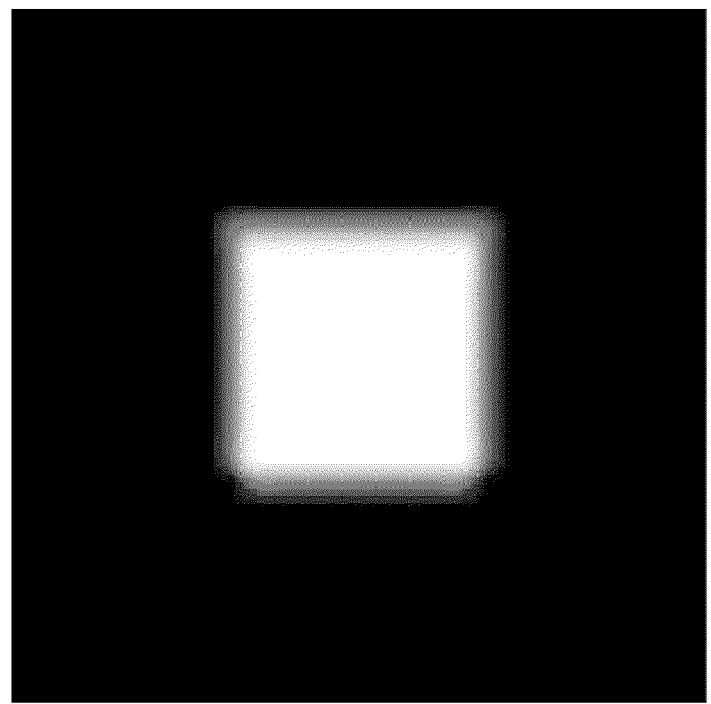
FIG. 8B is a diagram exemplarily showing an image according to the corrected image data of FIG. 8A.

FIG. 8A shows image data about a white square in a black background and examples of corrected image data of the image data according to an embodiment. FIG. 8B exemplarily shows an image according to the corrected image data of FIG. 8A.

A screen displaying data obtained by performing the sub-pixel rendering on the image data of FIG. 8A is shown in FIG. 6B. As described above with reference to FIG. 6B, the upper edge, the left edge, and the right edge of the square represent red and blue colors, and the lower edge of the square represents green color. A brightness level of the red and blue colors at the left and right edges of the square is less than that of the red and blue colors at the upper edge. To address this, according to the present embodiment, green data in the pixel data corresponding to the black pixels corresponding to the upper edge of the square is changed, for example, from 0 to 170. Red data and blue data of the pixel data corresponding to the black pixels at the lower edge is changed, from 0 to 170. Accordingly, the corrected image data includes the red data, the green data, and the blue data as shown in a lower column in FIG. 8A.

Figure 8C:
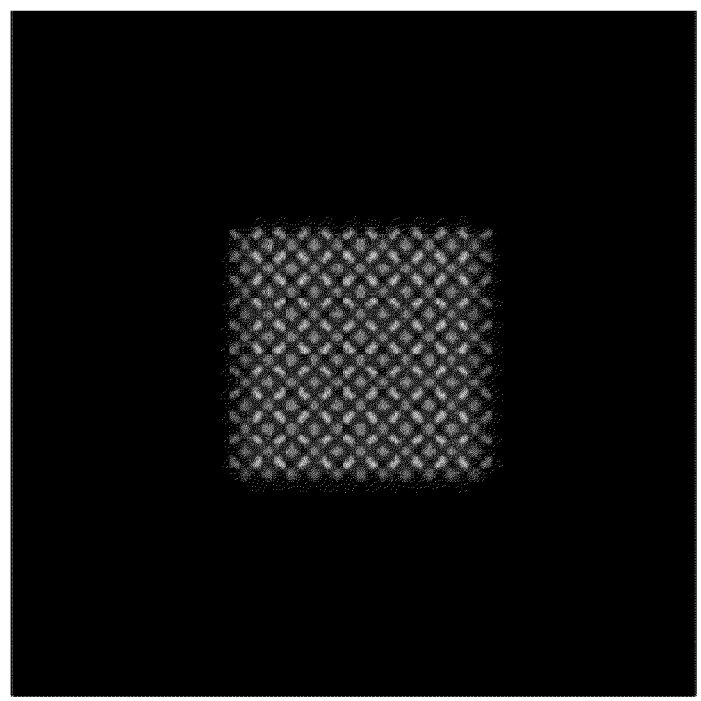
FIG. 8C is a diagram of a screen of a diamond PenTile display apparatus that displays the corrected image data of FIG. 8A.
Figure 8D:
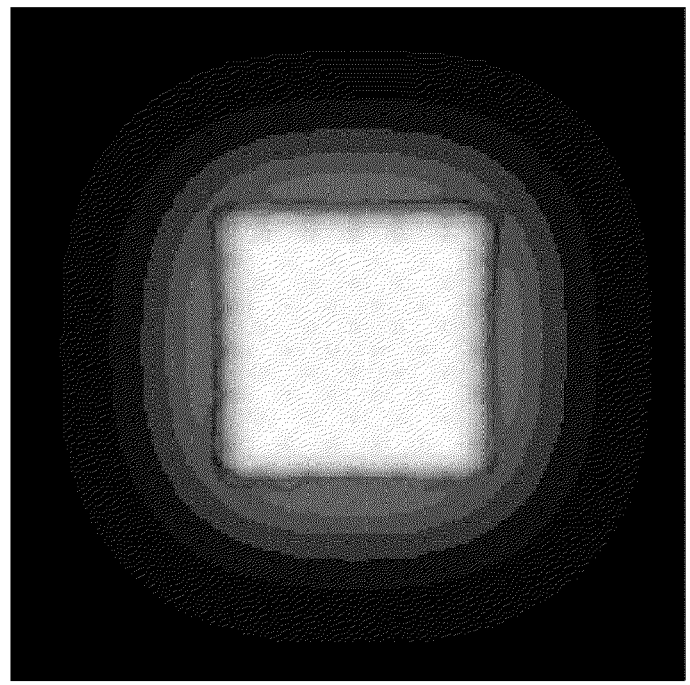
FIG. 8D is a view of an image of the screen shown in FIG. 8C, seen from a viewer's point.
Figure 8E:
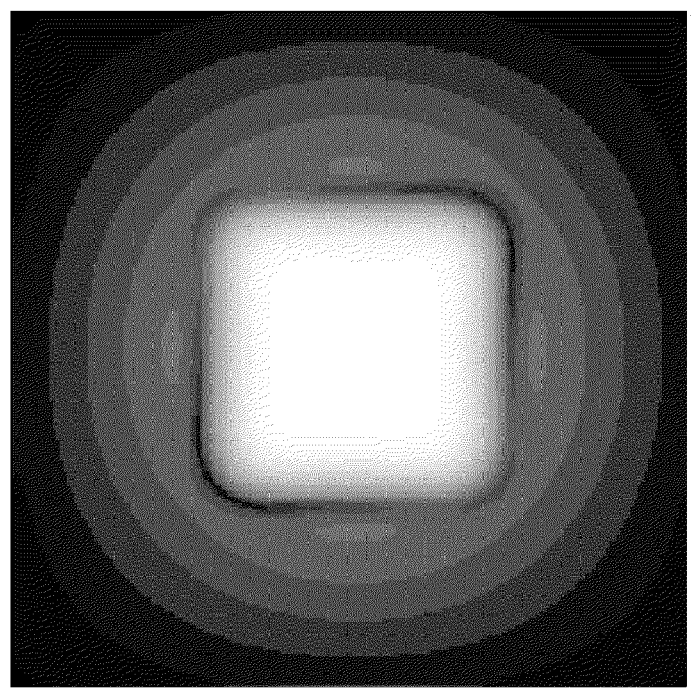
FIG. 8E is a diagram of an image of the screen shown in FIG. 8C, seen from the viewer's point.

FIG. 8C shows a screen displaying the corrected image data of FIG. 8A on a diamond PenTile display apparatus. FIG. 8D is a view of the screen shown in FIG. 8C, seen from a viewer's point. FIG. 8E is a diagram showing the screen of FIG. 8C, seen from a viewer's point.

Referring to FIG. 8C, the green sub-pixels are arranged at the upper edge, the left edge, and the right edge of the square to represent the green color. The red sub-pixels and the blue sub-pixels are arranged at the lower edge of the square to represent the red and blue colors. Referring to FIGS. 6B and 8C, the red and blue represented at the upper edge of the square shown in FIG. 6B are mixed with the green represented at the upper edge of the square shown in FIG. 8C. The red and blue represented at the left edge and the right edge of the square shown in FIG. 6B are mixed with the green represented at the left edge and the right edge of FIG. 8C. As shown in FIGS. 8D and 8E, the white square in the black background is displayed on the diamond PenTile display apparatus.

Table 2 below exemplarily shows corrected pixel data with respect to patterns of FIG. 2. In Table 2, the pixel data is original pixel data corresponding to a pixel to be corrected, and the corrected pixel data denotes a value of the corrected pixel data that the pixel to be corrected can have. In Table 2 below, the pixel to be corrected is a pixel in the black region (for example, a black pixel), and it is assumed that the pixel data corresponding to the pixel to be corrected has a value of (0, 0, 0). The examples of the corrected pixel data in Table 2 is applied when the sub-pixel rendering is performed on red data and blue data in the image data. That is, when the blue data in the pixel data corresponding to the first pixel is represented by using a third pixel in the second pixel adjacent to the first pixel and the red data of the pixel data corresponding to the second pixel is represented by using the first sub-pixel of the first pixel adjacent to the second pixel, the pixel data of the pixel to be corrected is changed into the corrected pixel data as shown in Table 2.

TABLE 2

| pattern | boundary direction | Arrangement of black region | Pixel data | Corrected pixel data |
|---|---|---|---|---|
| (a) | Row direction | Upper | (0, 0, 0) | (0, 170, 0) |
| (b) | Row direction | Lower | (0, 0, 0) | (170, 0, 170) |
| (c) | Column direction | Left | (0, 0, 0) | (0, 100, 0) |
| (d) | Column direction | Right | (0, 0, 0) | (0, 100, 0) |
| (e) | first diagonal direction | Upper left | (0, 0, 0) | (0, 193, 0) |
| (f) | second diagonal direction | Upper right | (0, 0, 0) | (0, 193, 0) |
| (g) | second diagonal direction | Lower left | (0, 0, 0) | (170, 100, 170) |
| (h) | first diagonal direction | Lower right | (0, 0, 0) | (170, 100, 170) |

As shown in Table 2, the pixel to be corrected can be determined as a black pixel.

If the boundary direction is the row direction and the black region is located above the boundary, the green data in the pixel data corresponding to the pixel to be corrected is increased, for example, from 0 to 170.

If the boundary direction is the row direction and the black region is located below the boundary, the red data and the blue data in the pixel data corresponding to the pixel to be corrected is increased, for example, from 0 to 170. Also, for example, if the pixel to be corrected is the first pixel, the red data is increased from 0 to 170, and the pixel to be corrected is the second pixel, the blue data is increased from 0 to 170.

If the boundary direction is the column direction, the green data in the pixel data corresponding to the pixel to be corrected is increased, for example, from 0 to 100, even when the black region is located at any of left and right sides of the boundary.

If the boundary direction is the first diagonal direction and the black region is located at the upper left portion of the boundary, the green data in the pixel data corresponding to the pixel to be corrected is increased, for example, from 0 to 193.

If the boundary direction is the second diagonal direction and the black region is located at the upper right portion of the boundary, the green data in the pixel data corresponding to the pixel to be corrected is increased, for example, from 0 to 193.

If the boundary direction is the second diagonal direction and the black region is located at the lower left portion of the boundary, the red data and the blue data in the pixel data corresponding to the pixel to be corrected is increased, for example, from 0 to 170. If the pixel to be corrected is the first pixel, the red data is increased, for example, from 0 to 170, and if the pixel to be corrected is the second pixel, the blue data is increased, for example, from 0 to 170. Also, the green data in the pixel data corresponding to the pixel to be corrected is increased, for example, from 0 to 100. The increased amount of the red data or the blue data in the pixel data corresponding to the pixel to be corrected can be greater than that of the green data in the pixel data.

If the boundary direction is the first diagonal direction and the black region is located at the lower right portion of the boundary, the red data and the blue data in the pixel data corresponding to the pixel to be corrected is increased, for example, from 0 to 170. If the pixel to be corrected is the first pixel, the red data can be increased from 0 to 170, and if the pixel to be corrected is the second pixel, the blue data is increased from 0 to 170. Also, the green data in the pixel data corresponding to the pixel to be corrected is increased, for example, from 0 to 100. The increased amount of the red data or the blue data in the pixel data corresponding to the pixel to be corrected can be greater than that of the green data in the pixel data.

According to another embodiment, the pixel to be corrected is determined as a white pixel.

If the boundary direction is the row direction and the white region is located above the boundary, the green data can be reduced.

If the boundary direction is the row direction and the white region is located below the boundary, the red data and the blue data can be reduced. If the pixel to be corrected is the first pixel, the red data can be reduced, and if the pixel to be corrected is the second pixel, the blue data can be reduced.

If the boundary direction is the column direction, the red data and the blue data can be reduced even when the white region is located at any of the left and right portions of the boundary. If the pixel to be corrected is the first pixel, the red data can be reduced, and if the pixel to be corrected is the second pixel, the blue data can be reduced. A reduced amount of data in this case can be less than that when the boundary direction is the row direction and the white region is located below the boundary.

If the boundary direction is the first diagonal direction and the white region is located at the upper left portion of the boundary, the green data and the blue data can be reduced.

If the boundary direction is the second diagonal direction and the white region is located at the upper right portion of the boundary, the green data and the red data can be reduced.

If the boundary direction is the second diagonal direction and the white region is located at the lower left portion of the boundary, the blue data can be reduced. Also, the red data in the pixel data corresponding to other pixels that are adjacent to the pixel to be corrected in the white region can be reduced.

If the boundary direction is the first diagonal direction and the white region is located at the lower right portion of the boundary, the red data can be reduced.

According to another embodiment, the sub-pixel rendering on the image data is not performed. Also, the pixel to be corrected can be determined as a black pixel.

If the boundary direction is the row direction and the black region is located above the boundary, the green data can be increased, for example, from 0 to 170.

If the boundary direction is the row direction and the black region is located below the boundary, the red data and the blue data is increased, for example, from 0 to 170. Also, for example, if the pixel to be corrected is the first pixel, the red data is increased from 0 to 170, and if the pixel to be corrected is the second pixel, the blue data is increased from 0 to 170.

If the boundary direction is the column direction and the black region is located at the left portion of the boundary, the green data can be increased, for example, from 0 to 170.

If the boundary direction is the column direction and the black region is located at the right portion of the boundary, the red data and the blue data is increased, for example, from 0 to 170. Also, for example, if the pixel to be corrected is the first pixel, the red data is increased from 0 to 170, and if the pixel to be corrected is the second pixel, the blue data is increased from 0 to 170.

If the boundary direction is the first diagonal direction and the black region is located at the upper left portion of the boundary, the blue data and the green data can be increased.

If the boundary direction is the second diagonal direction and the black region is located at the upper right portion of the boundary, the blue data can be increased.

If the boundary direction is the second diagonal direction and the black region is located at the lower left portion of the boundary, the blue data can be increased.

If the boundary direction is the first diagonal direction and the black region is located at the lower right portion of the boundary, the blue data and the red data can be increased.

So far, an example of the image display method capable of removing edge discoloration in the diamond PenTile display apparatus has been described. However, one or more embodiments can be applied to other display apparatuses having different sub-pixel arrangements, as well as the diamond PenTile display apparatus.

The image display method according to an embodiment will be described below.

The image data is externally transmitted and can be stored in the image data reception unit 110 of FIG. 1.

A boundary between the black region and the white region is determined in the image data. The boundary between the black region and the white region is determined by, for example, the boundary determination unit 120 of FIG. 1.

A pixel to be corrected, which is adjacent to the boundary, is determined. The pixel to be corrected is determined by, for example, the boundary determination unit 120 of FIG. 1, from among the pixels corresponding to the pixel data in the second line memory 112.

A direction of the boundary adjacent to the pixel to be corrected and the arrangement of the black region and the white region with respect to the boundary are determined. The boundary direction and the arrangement of the black region and the white region is determined by, for example, the boundary determination unit 120 of FIG. 1, based on the pattern information stored in the storage unit 140.

The pixel data corresponding to the pixel to be corrected can be changed into the corrected pixel data based on the boundary direction and the arrangement of the black region and the white region. The pixel data corresponding to the pixel to be corrected is changed by, for example, the image data correction unit 130 of FIG. 1 with reference to the corrected pixel data stored in the storage unit 140.

FIG. 9 is a flowchart showing an exemplary operation or procedure 900 for displaying an image according to one embodiment. Depending on the embodiment, additional states may be added, others removed, or the order of the states changed in FIG. 9. The method includes receiving image data including a black region and a white region (910), first determining a boundary between the black and white regions (920), second determining a pixel to be corrected which is adjacent to the boundary (930), determining a direction of the boundary and an arrangement of the black and white regions with respect to the boundary (940), converting pixel data corresponding to the pixel into corrected pixel data based at least in part on the boundary direction and the arrangement (950), and displaying images on a display apparatus based at least in part on corrected image data including the corrected pixel data (960).

In some embodiments, the FIG. 9 procedure is implemented in a conventional programming language, such as C or C++ or another suitable programming language. The program can be stored on a computer accessible storage medium of the data correction apparatus 100, for example, a memory (not shown) of the data correction apparatus 100 or storage unit 140. In certain embodiments, the storage medium includes a random access memory (RAM), hard disks, floppy disks, digital video devices, compact discs, video discs, and/or other optical storage mediums, etc. The program can be stored in the processor. The processor can have a configuration based on, for example, i) an advanced RISC machine (ARM) microcontroller and ii) Intel Corporation's microprocessors (e.g., the Pentium family microprocessors). In certain embodiments, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 8/7/Vista/2000/9x/ME/XP, Macintosh OS, OS X, OS/2, Android, iOS and the like. In another embodiment, at least part of the procedure can be implemented with embedded software.

The corrected image data including the corrected pixel data is transmitted to the display apparatus, and the display apparatus displays images based on the corrected image data.

It should be understood that the exemplary embodiments described therein should be considered in a descriptive sense only and not for purposes of limitation. Descriptions of features or aspects within each embodiment should typically be considered as available for other similar features or aspects in other embodiments.

The inventive technology has been described with reference to the figures, and it will be understood by those of ordinary skill in the art that various changes in form and details can be made therein without departing from the spirit and scope of the present invention as defined by the following claims.

What is claimed is:

1. An image display method comprising:
receiving image data including a black region and a white region;
determining a boundary between the black and white regions;
determining a pixel to be corrected which is adjacent to the boundary;
determining a direction of the boundary and an arrangement of the black and white regions with respect to the boundary;
converting pixel data corresponding to the pixel into corrected pixel data based at least in part on the boundary direction and the arrangement; and
displaying images on a display device based at least in part on corrected image data including the corrected pixel data,
wherein the display device comprises first and second pixels that are alternately arranged along horizontal and vertical directions,
wherein each of the first pixels comprises first and second sub-pixels respectively displaying first and second colors, wherein each of the second pixels comprises a third sub-pixel displaying a third color and the second sub-pixel, and
wherein the image data comprises first to third sub-pixel data respectively corresponding to the first to third sub-pixels.

2. The image display method of claim 1, wherein the pixel determining comprises:
determining a region as the black region, in which there is a group of pixels corresponding to pixel data having a brightness value that is substantially equal to or less than a first brightness value; and
determining a region as the white region, in which there is a group of pixels corresponding to pixel data having a brightness value that is substantially equal to or greater than a second brightness value.

3. The image display method of claim 1, wherein the pixel determining comprises, if the difference between first and second brightness values of the pixel data corresponding to two adjacent pixels is substantially equal to or greater than a third brightness value, determining a space between the two adjacent pixels as the boundary, and
wherein the boundary determining comprises determining at least one of the two adjacent pixels as the pixel to be corrected.

4. The image display method of claim 1, wherein the boundary determining comprises determining a pixel in the black region as the pixel to be corrected, and wherein the converting comprises increasing a value of at least one sub-pixel data included in the pixel data by a value that is determined based at least in part on the boundary direction and the arrangement so as to generate the corrected pixel data.

5. The image display method of claim 1, wherein the boundary determining comprises determining a pixel in the white region as the pixel to be corrected, and wherein the converting comprises decreasing a value of at least one sub-pixel data included in the pixel data by a value determined based at least in part on the boundary direction and the arrangement so as to generate the corrected pixel data.

6. The image display method of claim 1, wherein the pixel to be corrected comprises first and second sub-pixels, wherein the first sub-pixel is closer to the boundary than the second sub-pixel, and wherein the converting comprises determining whether a variation amount of first sub-pixel data corresponding to the first sub-pixel is greater than a variation amount of second sub-pixel data corresponding to the second sub-pixel.

7. The image display method of claim 1, wherein the boundary direction is one of i) a horizontal direction, ii) a vertical direction, iii) a first substantially diagonal direction extending from a first quadrant to a third quadrant, and iv) a second substantially diagonal direction extending from a second quadrant to a fourth quadrant, and wherein the first to fourth quadrants are located with respect to the pixel to be corrected.

8. The image display method of claim 1, wherein the first and second sub-pixels are respectively located at an upper left portion of the second sub-pixel in the first and second pixels.

9. The image display method of claim 1, wherein the black and white regions are included in a 3×3 pixel matrix, and wherein the direction of the boundary includes a column, row or diagonal direction of the matrix.

10. The image display method of claim 8, wherein the boundary determining comprises determining a pixel in the black region as the pixel to be corrected.

11. The image display method of claim 10, wherein the converting comprises, if the boundary direction is the horizontal direction and the black region is located above the boundary, increasing a value of the second sub-pixel data in the pixel data so as to generate the corrected pixel data.

12. The image display method of claim 10, wherein the converting comprises, if the boundary direction is the horizontal direction and the black region is located below the boundary, increasing a value of at least one of the first and third sub-pixel data in the pixel data so as to generate the corrected pixel data.

13. The image display method of claim 10, wherein the converting comprises, if the boundary direction is the vertical direction and the black region is located at a left portion of the boundary, increasing a value of the second sub-pixel data in the pixel data so as to generate the corrected pixel data.

14. The image display method of claim 10, wherein the converting comprises, if the boundary direction is the vertical direction and the black region is located at a right portion of the boundary, increasing a value of at least one of the first and third sub-pixel data in the pixel data so as to generate the corrected pixel data.

15. The image display method of claim 10, further comprising performing a sub-pixel rendering operation on the first and third sub-pixel data of the image data, wherein the performing comprises i) displaying the third sub-pixel data of the first pixel by using the third sub-pixel in one of the adjacent second pixels and ii) displaying the first sub-pixel data of the second pixel by using the first sub-pixel in one of the adjacent first pixels.

16. The image display method of claim 15, wherein the converting comprises, if the boundary direction is the vertical direction, increasing a value of the second sub-pixel data in the pixel data so as to generate the corrected pixel data.

17. The image display method of claim 15, wherein the converting comprises, if i) the boundary direction is a first substantially diagonal direction extending from a first quadrant to a third quadrant and the black region is located at an upper left portion of the boundary or ii) the boundary direction is a second substantially diagonal direction extending from a second quadrant to a fourth quadrant and the black region is located at an upper right portion of the boundary, increasing a value of the second sub-pixel data in the pixel data so as to generate the corrected pixel data, and wherein the first to fourth quadrants are located with respect to the pixel to be corrected.

18. The image display method of claim 15, wherein the converting comprises, if i) the boundary direction is a first substantially diagonal direction extending from a first quadrant to a third quadrant and the black region is located at a lower right portion of the boundary or ii) the boundary direction is a second substantially diagonal direction extending from a second quadrant to a fourth quadrant and the black region is located at a lower left portion of the boundary, increasing a first value of at least one of the first and third sub-pixel data in the pixel data and a second value of the second sub-pixel data in the pixel data so as to generate the corrected pixel data, wherein the first to fourth quadrants are located with respect to the pixel to be corrected, and wherein the increased amount of the first value is greater than the increased amount of the second value.

19. The image display method of claim 8, wherein the boundary determining comprises determining a pixel in the white region as the pixel to be corrected, and wherein, if the boundary direction is the horizontal direction and the white region is located above the boundary, decreasing the value of the second sub-pixel data in the pixel data so as to generate the corrected pixel data.

20. The image display method of claim 8, wherein the boundary determining comprises determining a pixel in the white region as the pixel to be corrected, and wherein, if the boundary direction is the horizontal direction and the white region is located below the boundary, decreasing the value of at least one of the first sub-pixel data and the third sub-pixel data in the pixel data so as to generate the corrected pixel data.

* * * * *